US007228296B2

(12) United States Patent
Matsuda

(10) Patent No.: US 7,228,296 B2
(45) Date of Patent: Jun. 5, 2007

(54) DEVICES FOR INTERPRETING AND RETRIEVING XML DOCUMENTS, METHODS OF INTERPRETING AND RETRIEVING XML DOCUMENTS, AND COMPUTER PRODUCT

(75) Inventor: Tomotaka Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 452 days.

(21) Appl. No.: 10/780,404

(22) Filed: Feb. 17, 2004

(65) Prior Publication Data

US 2004/0193627 A1 Sep. 30, 2004

(30) Foreign Application Priority Data

Mar. 27, 2003 (JP) ............................. 2003-089126

(51) Int. Cl.
*G06F 17/30* (2006.01)
(52) U.S. Cl. .......................................... 707/2; 707/100
(58) Field of Classification Search ................ 707/1, 707/3, 6, 100, 2, 7; 715/513, 509
See application file for complete search history.

(56) References Cited

U.S. PATENT DOCUMENTS

| | | | | |
|---|---|---|---|---|
| 6,636,845 | B2 * | 10/2003 | Chau et al. ..................... 707/1 |
| 6,643,633 | B2 * | 11/2003 | Chau et al. ..................... 707/1 |
| 6,721,727 | B2 * | 4/2004 | Chau et al. ..................... 707/3 |
| 2002/0123993 | A1 * | 9/2002 | Chau et al. ..................... 707/5 |
| 2003/0014397 | A1 * | 1/2003 | Chau et al. ..................... 707/3 |
| 2004/0044959 | A1 * | 3/2004 | Shanmugasundaram et al. ..................... 715/513 |
| 2005/0055358 | A1 * | 3/2005 | Krishnaprasad et al. .... 707/100 |
| 2005/0114763 | A1 * | 5/2005 | Nonomura et al. ......... 715/513 |

FOREIGN PATENT DOCUMENTS

JP 2000-250938 9/2000

\* cited by examiner

*Primary Examiner*—Cheryl Lewis
(74) *Attorney, Agent, or Firm*—Greer, Burns & Crain, Ltd.

(57) ABSTRACT

A device includes a section to input retrieval conditions, a section that judges whether documents-structure data arranged according to a tree structure in an order of appearance of elements in XML documents matches with corresponding one of the retrieval conditions input, a section that extracts character string in character-string data associated with documents-structure data, which matches with the retrieval conditions, and a section that judges whether the character string extracted matches with the retrieval conditions.

10 Claims, 14 Drawing Sheets

FIG.7

```
<PRODUCT LIST xmlns = "urn:fj">
<SERIAL NUMBER = '0001'>
<NAME> FMV </NAME>
<PRICE> 300000 </PRICE>
</PRODUCT>
<SERIAL NUMBER = '0002'>
<NAME> LOOX </NAME>
<PRICE> 200000 </PRICE>
</PRODUCT>
</PRODUCT LIST>
```

FIG.8

| NODE-TYPE | LINK DATA | | | |
| --- | --- | --- | --- | --- |
| | NAME SPACE ID | ELEMENT NAME ID | DATA TYPE ID | ELEMENT NAME/ ATTRIBUTE DATA ID |
| START OF DOCUMENT | — | — | — | — |
| START OF ELEMENT | 0 | 1 | — | — |
| NAME SPACE MAP | 0 | 0 | TEXT | 0 |
| START OF ELEMENT | 0 | 2 | — | — |
| ATTRIBUTE | 0 | 3 | TEXT | 1 |
| 1 CHILD ELEMENT | 0 | 4 | TEXT | 2 |
| 1 CHILD ELEMENT | 0 | 5 | INTEGER | 0 |
| END OF ELEMENT | 0 | 2 | — | — |
| START OF ELEMENT | 0 | 2 | — | — |
| ATTRIBUTE | 0 | 3 | TEXT | 3 |
| 1 CHILD ELEMENT | 0 | 4 | TEXT | 4 |
| 1 CHILD ELEMENT | 0 | 5 | INTEGER | 1 |
| END OF ELEMENT | 0 | 2 | — | — |
| END OF ELEMENT | 0 | 1 | — | — |
| END OF DOCUMENTS | — | — | — | — |

FIG.9

| LINK DATA | NAME SPACE DATA |
|---|---|
| NAME SPACE ID | |
| 0 | Urn:fj |

FIG.10

| LINK DATA | ELEMENT NAME DATA |
|---|---|
| ELEMENT NAME ID | |
| 0 | — |
| 1 | PRODUCT LIST |
| 2 | PRODUCT |
| 3 | SERIAL NUMBER |
| 4 | NAME |
| 5 | PRICE |

FIG.11

| LINK DATA | ELEMENT NAME/ ATTRIBUTE DATA |
|---|---|
| ELEMENT NAME/ ATTRIBUTE DATA ID | INTEGER DATA |
| 0 | 300000 |
| 1 | 200000 |

FIG.12

| LINK DATA | ELEMENT NAME/ ATTRIBUTE DATA |
|---|---|
| ELEMENT NAME/ ATTRIBUTE DATA ID | TEXT DATA |
| 0 | Urn:fj |
| 1 | 0001 |
| 2 | FMV |
| 3 | 0002 |
| 4 | LOOX |

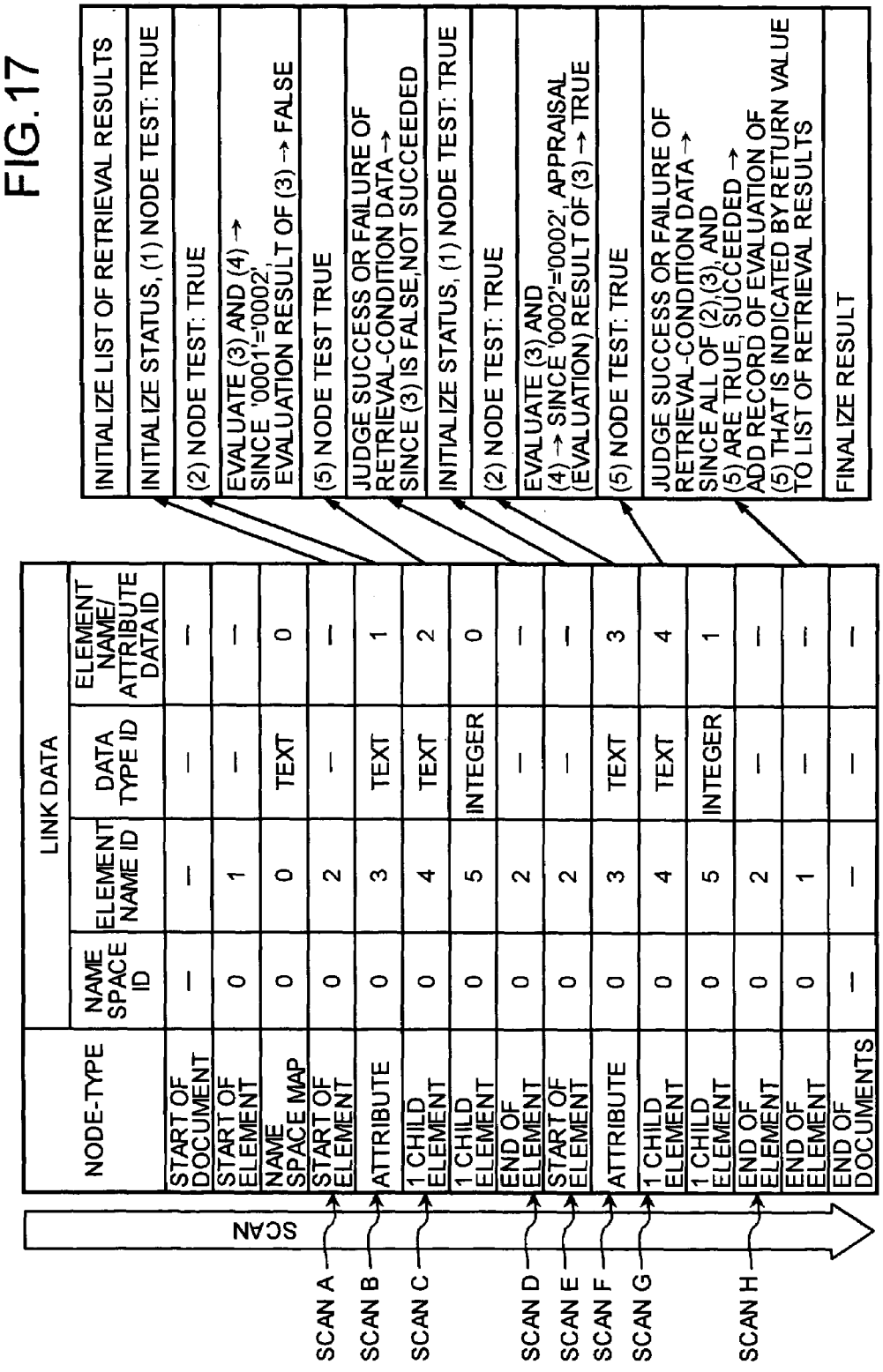

DEVICES FOR INTERPRETING AND RETRIEVING XML DOCUMENTS, METHODS OF INTERPRETING AND RETRIEVING XML DOCUMENTS, AND COMPUTER PRODUCT

CROSS-REFERENCE TO RELATED APPLICATIONS

This application is based upon and claims the benefit of priority from the prior Japanese Patent Application No. 2003-089126, filed on Mar. 27, 2003, the entire contents of which are incorporated herein by reference.

BACKGROUND OF THE INVENTION

1) Field of the Invention

The present invention relates to devices for interpreting and retrieving XML documents, methods of retrieving and interpreting the XML documents, and a computer product.

2) Description of the Related Art

An XML is a mark up language that can pad information by tags. Because document-structure and format information are strictly separated in the documents written in the XML, the XML is replacing the HTML.

Normally an XML parser is used to interpret the XML documents, which have a simple documents-structure. The XML parser is a module that includes functions of reading the XML documents and interpreting what kind of a documents-structure the XML document has.

An application programming interface (API) is employed in the XML parser. In this API, a document object model (DOM), and a simple API for XML (SAX) are standardized. XMLs with the APIs mounted are predominant.

In the XML parser of DOM (DOM parser), all XML documents are read and elements, attributes, and character data that are included in the XML documents are mounted to be interpreted as a tree structure. In the XML parser of SAX (SAX parser), unlike in the DOM parser, not all the XML documents are read but the elements, attributes, and character data that are included in the XML documents are mounted to be interpreted from the header of the XML documents, i.e. in an order starting from appearance of the elements.

An XML documents retrieving device that allows a user to retrieve efficiently an XML database that has a similar DTD semantically, without taking into consideration a difference of DTD, has been proposed in Japanese Patent Application Laid-open Publication No. 2000-250938

However, when the XML documents are to be extracted or retrieved from a database, the corresponding XML documents can be extracted or retrieved only after interpreting all the XML documents. In this case, for interpretation by the general DOM parser, all the XML documents are to be read. However, it takes a lot of time to interpret all the XML documents in the database.

In the general SAX parser, although it is not necessary to read all the XML documents, all information padded in the tags and information present between the tags is required to be read. However, it takes a lot of time to interpret all the XML documents in the database.

In the XML documents retrieving device disclosed in Japanese Patent Application Laid-open Publication No. 2000-250938, the following steps are performed according to a retrieval style (formula) for input created by a database client:

1) Extraction of an element name in an input analyzer,
2) Acquisition of a synonym for the element name from a synonym extractor,
3) Comparison of the synonym with an element name stored in a category analogic section, and
4) Selection of an element name that matches.

Therefore, since all element names are subjected to comparison, the retrieval takes time.

SUMMARY OF THE INVENTION

It is an object of the present invention to solve at least the problems in the conventional technology.

A method of interpreting an XML document, according to one aspect of the present invention, includes acquiring an XML document, wherein the XML document includes a plurality of elements that form a predetermined tree structure; arranging the elements in the XML document acquired in a row according to the tree structure in an order of appearance in the XML document of the elements; extracting character-string data from each of the elements arranged, wherein the character-string data include character string in a start tag and an end tag, and character string within the start tag and the end tag in the elements; identifying a node-type of each of the elements arranged, wherein the node-type indicates a kind in the tree structure for each of the elements; generating link data that associates character-string data extracted with a node-type identified for each of the elements arranged.

A method of retrieving an XML document in which a character string is retrieved from character-string data in the XML document that have a predetermined tree structure, according to another aspect of the present invention, includes acquiring retrieval conditions; judging whether first document-structure data obtained by arranging elements in the XML document according to the tree structure in an order of appearance of the elements matches with the retrieval conditions acquired; extracting a character string in the character-string data associated with the first document-structure data that is judged to match with the retrieval conditions; judging whether the character string extracted matches with the retrieval conditions; judging whether second document-structure data arranged subsequent to the first document-structure data matches with the retrieval conditions upon judging that the character string extracted matches with the retrieval conditions; and extracting a character string in the character-string data associated with the second document-structure data that is judged to match with the retrieval conditions upon judging that the second document-structure data arranged subsequent to the first document-structure data matches with the retrieval conditions.

A device for interpreting XML documents, according to still another aspect of the present invention, includes an acquiring unit that acquires an XML document, wherein the XML document includes a plurality of elements that form a predetermined tree structure; an arranging unit that arranges the elements in the XML document acquired in a row according to the tree structure in an order of appearance in the XML document of the elements; an extracting unit that extracts character-string data from each of the elements arranged, wherein the character-string data include character string in a start tag and an end tag, and character string within the start tag and the end tag in the elements; an identifying unit that identifies a node-type of each of the elements arranged, wherein the node-type indicates a kind in the tree structure for each of the elements; a generating unit that generates link data that associates character-string data extracted with a node-type identified for each of the elements arranged.

An XML documents retrieving device that retrieves character strings from character-string data in XML documents that have a predetermined tree structure, according to still another aspect of the present invention, includes an XML documents acquiring unit that acquires a plurality of retrieval conditions; a documents-structure data judging unit that judges whether a plurality of documents-structure data arranged according to the tree structure in an order of appearance of elements in the XML documents matches with a corresponding one of the respective retrieval conditions; a related character-string extractor that extracts character strings in the character-string data associated with the documents-structure data that is judged to match with the retrieval conditions; and a related character-string judging unit that judges whether character string extracted by the related character-string extractor matches with a corresponding one of the retrieval conditions. When the related character-string judging unit judges that the character string matches with the retrieval conditions and when the documents-structure judging unit judges that the documents-structure data arranged subsequent to the documents-structure data that matches with the retrieval conditions, the related character-string extracting unit extracts character-string in the character-string data associated with documents-structure data other than the documents-structure data that is judged to match with the retrieval conditions, as the character string subjected to retrieval.

Computer programs according to still another aspects of the present invention make it possible to realize the methods according to the present invention on a computer.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 7 is an example of the XML documents;

FIG. 8 is an example of documents-structure data;

FIG. 9 is an example of character-string data (name space data);

FIG. 10 is an example of character-string data (data of names of elements);

FIG. 11 is an example of character-string data (data of names/attributes of elements (integer data));

FIG. 12 is an example of character-string data (data of names/attributes of elements (text data));

FIG. 17 is an illustration of transitions in status during retrieval of the XML documents according to the embodiment of the present invention.

DETAILED DESCRIPTION

Exemplary embodiments of devices for interpreting and retrieving XML documents, methods of retrieving and interpreting the XML documents, and a computer product relating to the present invention are described below in detail with reference to the accompanying drawings.

Figure 1:
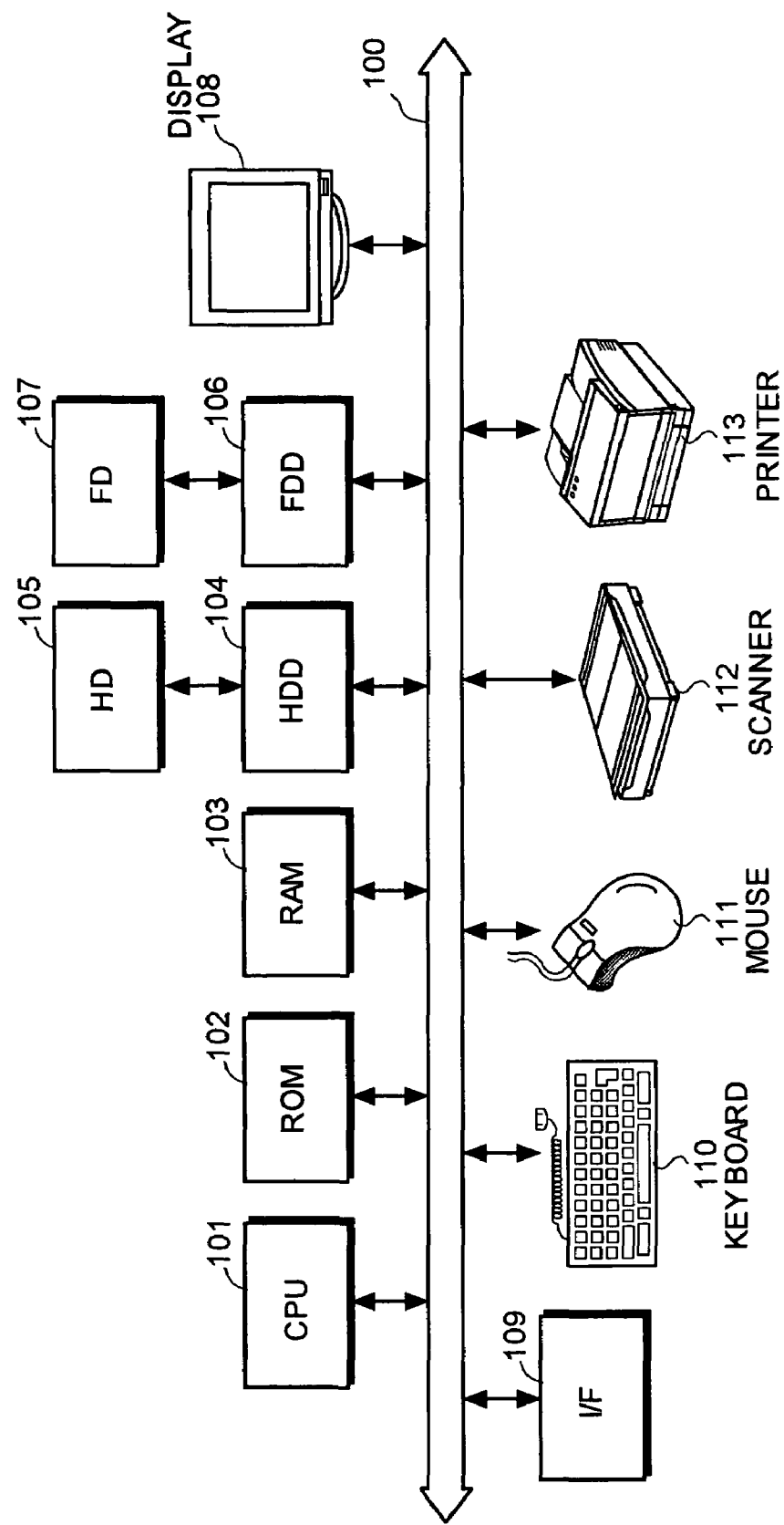
FIG. 1 is a block diagram of a hardware configuration of an XML documents interpreting and retrieving device according to an embodiment of the present invention.

As shown in FIG. 1, an XML documents interpreting and retrieving device according to an embodiment of the present invention includes a central processing unit (CPU) 101, a read only memory (ROM) 102, a random access memory (RAM) 103, a hard disc driver (HDD) 104, a hard disc (HD) 105, a flexible disc driver (FDD) 106, a flexible disc (FD) 107 as a detachable recording medium, a display 108, an interface (I/F) 109, a key board 110, a mouse 111, a scanner 112, and a printer 113. All the components are connected to each other by a bus 100.

The CPU 101 controls the XML documents interpreting and retrieving device. The ROM 2 stores programs like a boot program. The RAM 103 is the work area of the CPU 101. The HDD 104 controls reading and writing of data from and in the HD 105 according to the control by the CPU 101. The HD 105 stores data written by control of the HDD 104.

The FDD 106 controls reading and writing of data from and in the FD 107 according to the control by the CPU 101. The FD 107 stores data written by a control of the FDD 106. The XML documents interpreting and retrieving device reads data stored in the FD 107. A CD-ROM (CD-R, CD-RW), an MO, a digital versatile disk (DVD), and a memory card may be used as a detachable recording medium instead of the FD 107. The display 108 displays a cursor, icons or tool boxes, and data of documents, images, functions information etc. A cathode ray tube (CRT), a thin film transistor (TFT) liquid crystal display, a plasma display etc. can be used as display 108.

The I/F 109 is connected to a network like the Internet by a communication line. Other devices may be connected to the network. The I/F 109 controls the network and interfaces inside and also controls input and output of data to and from an external unit. A modem or a LAN adapter can be used as I/F 109.

The key board 110 includes keys to input characters, numbers, various instructions, and inputs data. A touch panel input pad or a tenkey may be used. The mouse 111 is operated to move the cursor, select a range, shift the windows, or change size of the windows. A trackball or a joy stick may be used instead of the mouse 111.

The scanner 112 reads an image optically and fetches image data to the XML documents interpreting and retrieving device. The printer prints the image data or text data. The printer 113 may be a laser printer or an ink-jet printer.

Figure 2:
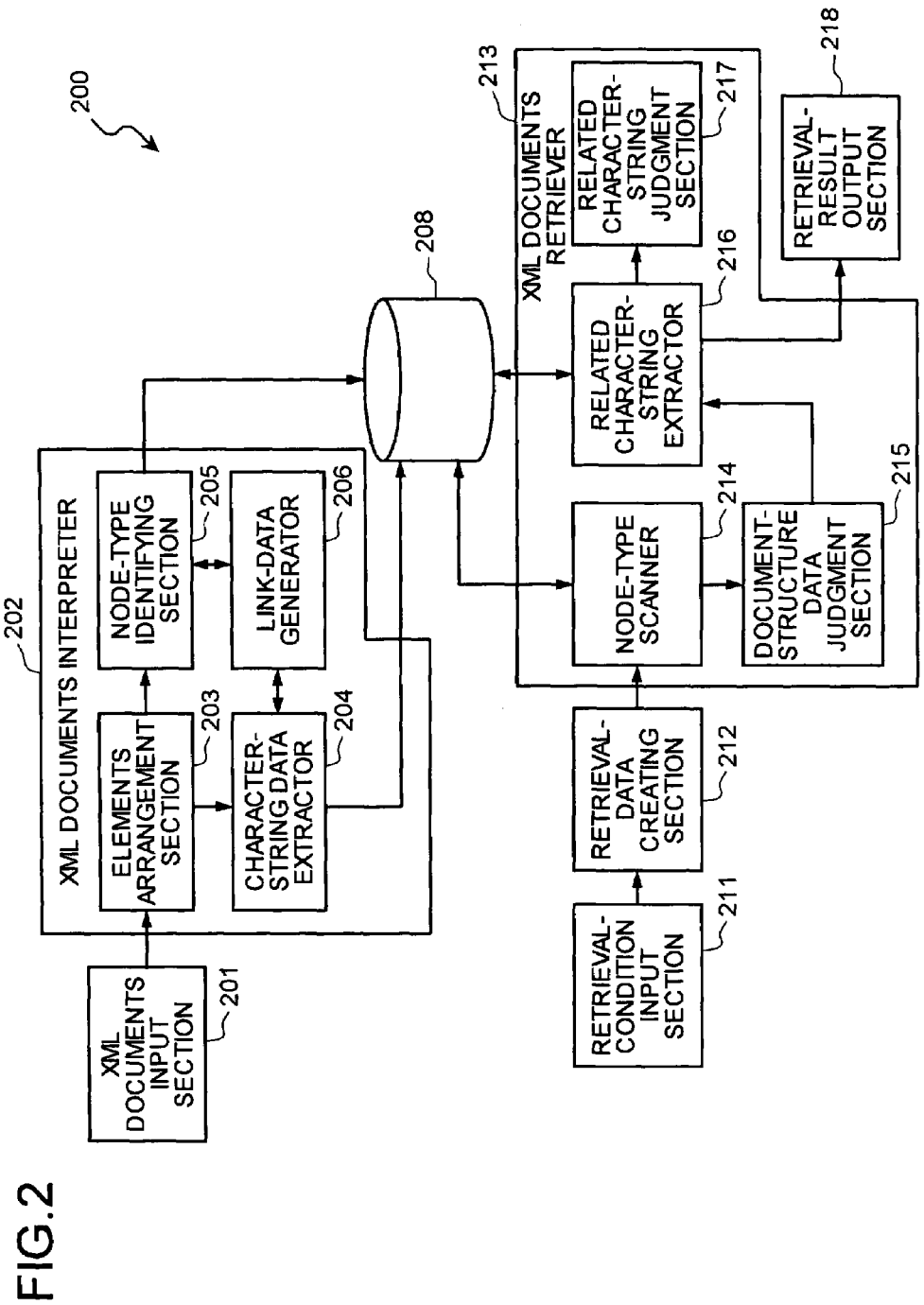
FIG. 2 is a block diagram of functional configuration of the XML documents interpreting and retrieving device.

FIG. 2 is a block diagram of a functional configuration of the XML documents interpreting and retrieving device 200. The XML documents interpreting and retrieving device 200 includes an XML documents input section 201, an XML documents interpreter 202, an XML documents storage 208, a retrieval-condition input section 211, a retrieval-data creating section 212, an XML documents retriever 213, and a retrieval-result output section 218.

Figure 3:
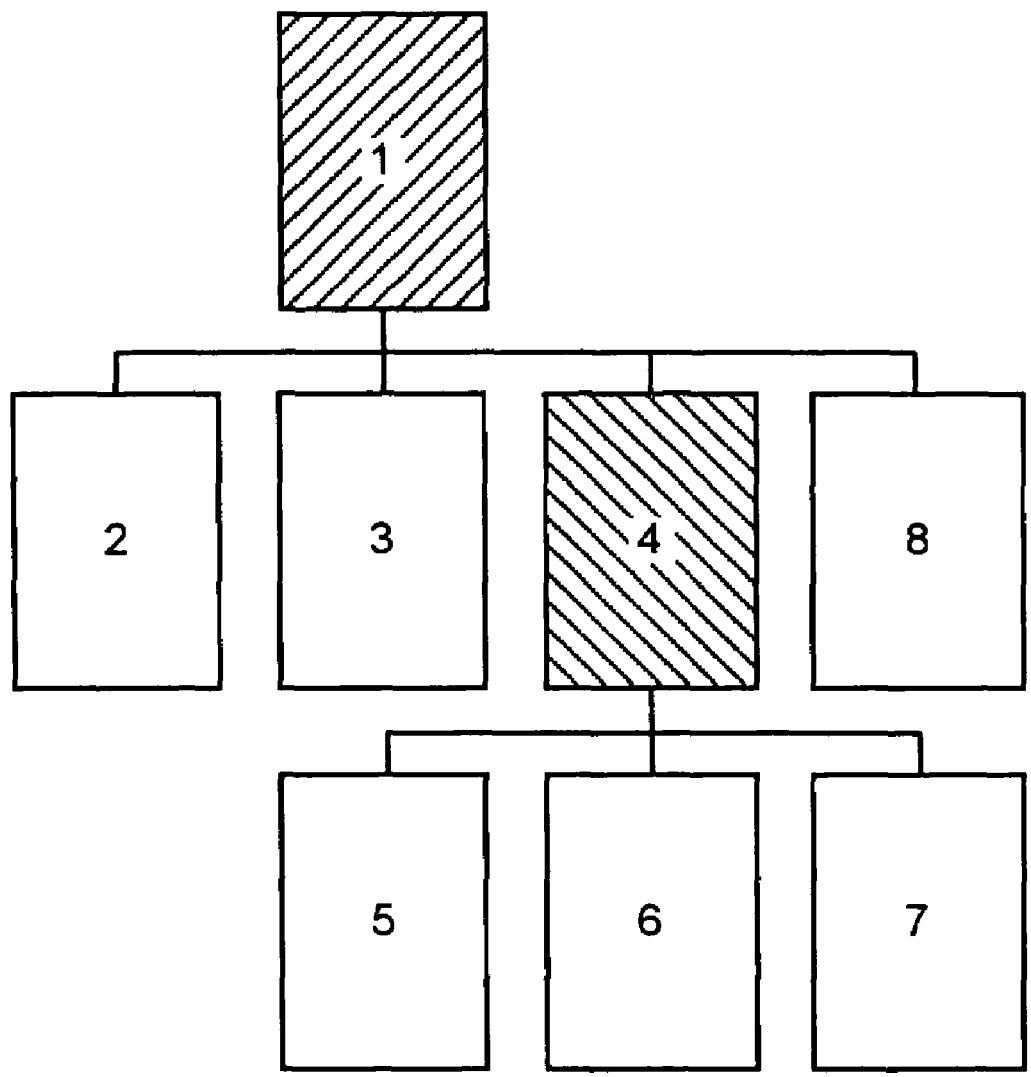
FIG. 3 is an illustration of a tree structure of XML documents.

The XML documents input section 201 inputs XML documents that are to be stored using an input device like a key board or a mouse 111. As shown in FIG. 3, the XML documents have a tree structure with an element at the top. The element at the top, i.e., an element 1, is a root element, elements 2 to 4 are child elements of the element. Elements 5 to 7 are child elements of element 4. Numbers assigned to elements in FIG. 3 indicate an order in which the elements in the XML documents appear. The XML documents input section 201, concretely, realizes an input function by the I/F 109.

The XML documents interpreter 202 includes an elements arrangement section 203, a character-string data extractor 204, a node-type identifying section 205, and a link-data generator 206. The elements arrangement section 203 arranges a plurality of elements according to the tree structure in an order of appearance of elements of the XML documents input.

The character-string data extractor 204 extracts character-string data from each element arranged in a row by the elements arrangement section 203. The character-string data includes character strings between tags, which are character strings between a start tag and an end tag in each element and character strings in tags, which are character strings in the start tag and the end tag.

In this case, the character-string data includes character strings in the tags, which are padded in the tags and character strings between the tags, which are between the tags. Examples of the character strings in the tags are name of element, attribute, name of name space, and other character data that are padded in the tags. Examples of the character strings between the tags are element contents and other character data that are padded between the start tag and the end tag.

In the character-string data, a length of a character string in the tags and a length of character strings between the tags (bit length) are variable. The character-string data includes name space data, element name data, element contents/attribute data that express contents of an element or an attribute of an element. The element contents/attribute data is divided according to kind of data. For example, the data can be divided into text data and integer data according to the kind viz. text and integer.

The node-type identifying section 205 identifies a node-type that expresses a kind of the tree structure for each element arranged in a row by the elements arrangement section 203. The node-type means data that indicates structural kind. Examples of the node-type are "start of documents" that indicates a position at the top (at the beginning) of the XML documents, "end of documents" that indicates a position at an end of the XML documents, "start of elements" that indicates starting element among branched elements (parent elements), "end of elements" that indicates last (ending) element among the branched elements (parent elements), "name space map" that indicates that a name space is padded into that element, "attribute" that indicates that an attribute is padded into that element, and "1 child element" indicates that that element is a branch element.

The link-data generator 206 generates for each element, link data that associates character-string data extracted by the character-string data extractor 204 with a node-type identified by the node-type identifying section 205.

The link data is an ID that associates the node-type with the character-string data. The link data includes a name space ID linked with name space data in the character-string data, an element name ID linked with element name data, a data-type ID linked with a kind of element contents/attribute data, and element name/attribute data ID linked with element name/attribute data.

The XML documents interpreter 202 realizes the function (of analyzing) due to execution of programs that are stored in the ROM 102, the RAM 103, the HD 105, the FD 107 etc. by the CPU 101 shown in FIG. 1 and due to the I/F 109 shown in FIG. 1.

The XML documents storage 208 stores documents-structure data and character-string data that are interpreted by the XML documents interpreter 202. The XML documents storage 208, realizes a function (of storing) by the RAM 103, HD 105, FD 107 etc.

The retrieval-condition input section 211 inputs retrieval conditions that are input by the input device like the key board 110 and the mouse 111 shown in FIG. 1 or that are input from the network. The retrieval-condition input section 211 realizes a function (of inputting) due to execution of the programs that are stored in the ROM 102, the RAM 103, the HD 105, the FD 107 etc. shown in FIG. 1 by the CPU 101 and due to the I/F 109 shown in FIG. 1.

The retrieval-data creating section 212 creates retrieval data from the retrieval conditions that are input, based on XML path language (XPath), an XML query language (XQL) that are recommended by World Wide Web Consortium (W3C). The retrieval-data creating section 212, realizes a function (of creating retrieval data) due to execution of the programs that are stored in the ROM 102, the RAM 103, the HD 105, the FD 107 etc. shown in FIG. 1 by the CPU 101 and due to the I/F 109 shown in FIG. 1. The XML documents retriever 213 retrieves character strings in the XML documents that match with retrieval data, from the XML documents that are stored in the XML documents storage 208.

The XML documents retriever 213 includes a node-type scanner 214, a documents-structure data judgment section 215, a related character-string extractor 216, and a related character-string judgment section 217. The node-type scanner 214 scans a node-type of the documents-structure data stored in the XML documents storage 208.

The documents-structure data judgment section 215 makes a judgment of whether the documents-structure data matches with the retrieval-data, whenever the node-type scanner 214 scans. Only in a case where the related character-string judgment section 217 judges the documents-structure data to match with the retrieval data, the character-string judgment section 217 makes a judgment of whether documents-structure data arranged subsequent to the documents-structure data scanned, matches with the retrieval data.

The related character-string extractor 216 extracts character strings in character-string data associated with the documents-structure data that matched with the retrieval data, only when the documents-structure data is judged to be matching with the retrieval data by the documents-structure data judgment section 215. The related character-string judgment section 217 makes a judgment of whether the character strings that are extracted by the related character-string extractor 216 match with the retrieval data.

The XML documents retriever 213 realizes a function (of retrieval) due to execution of the programs that are stored in the ROM 102, the RAM 103, the HD 105, the FD 107 etc. shown in FIG. 1 by the CPU 101 and due to the I/F 109 shown in FIG. 1.

The retrieval-result output section 218 outputs character strings that are retrieved (character strings that are subjected to retrieval) by the XML documents retriever 213 as a retrieval result. The retrieval-result output section 218 realizes a function (of outputting) due to the I/F 109 shown in FIG. 1.

Figure 4:
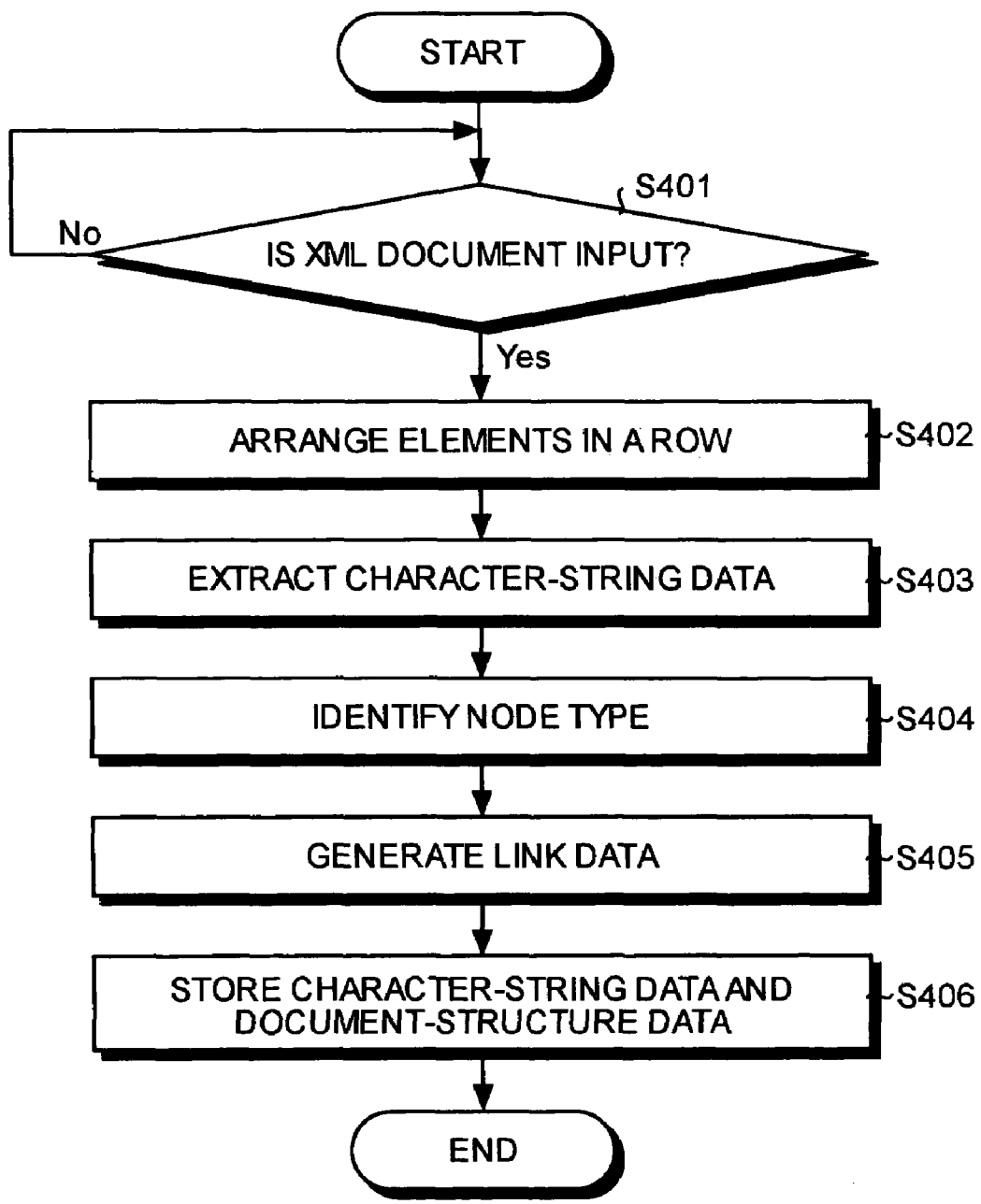
FIG. 4 is a flow chart of a procedure for analyzing the XML documents.
Figure 5:
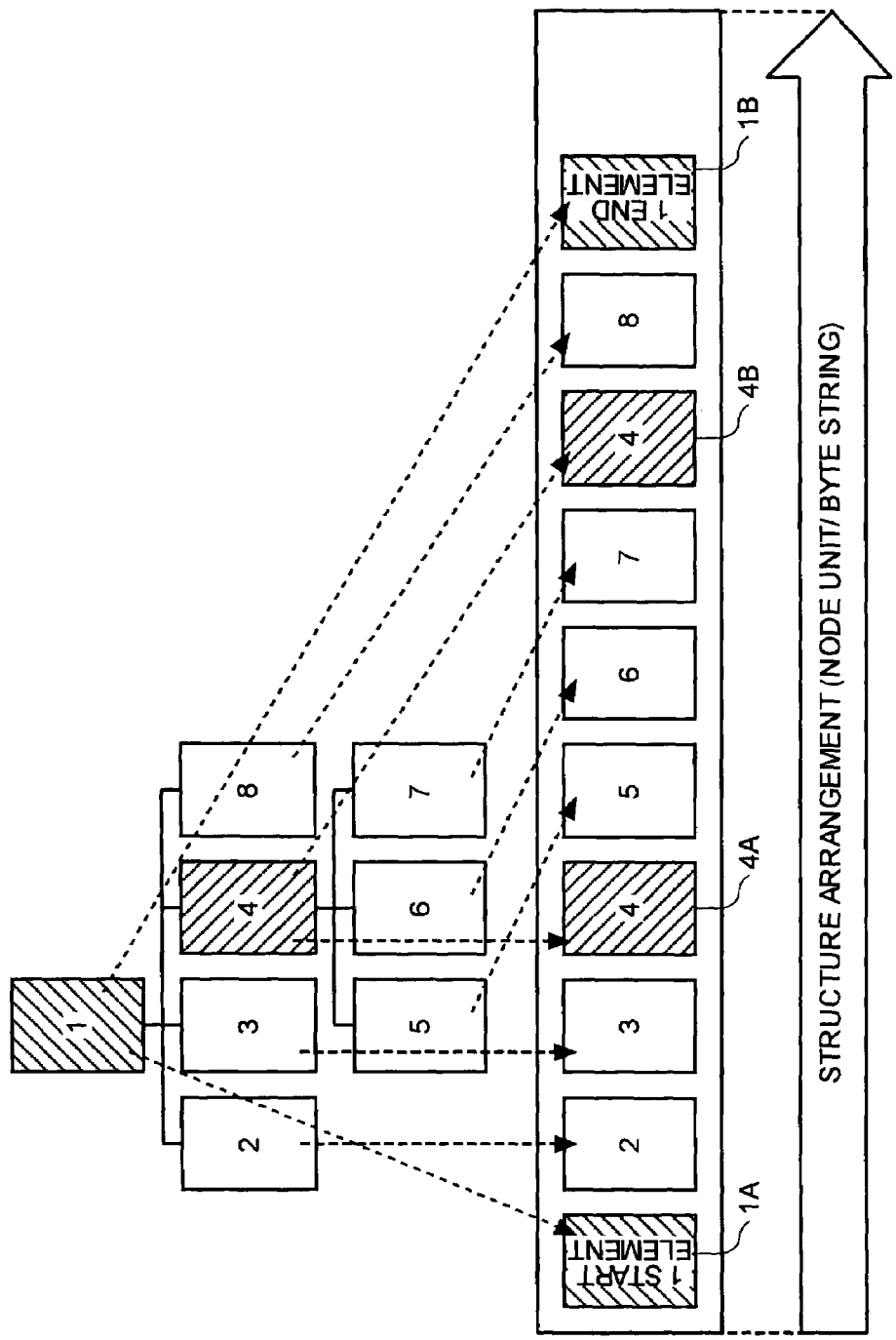
FIG. 5 is a schematic diagram of structural arrangement of the XML documents in the procedure for analyzing the XML documents.

A method of interpreting the XML documents is described with reference to a flow chart in FIG. 4. To start with, when the XML documents are input to the XML documents input section 201 (Yes at step S401), the XML documents are arranged, as shown in FIG. 5, in an order of elements (node units) appearing from the header (step S402). When arranging the elements, child elements are placed between corresponding parent elements.

For example, child elements 2 to 8 of the root element 1 are placed between a start element 1A and an end element 1B. The start element 1A and the end element 1B are identical to the root element 1. Moreover, child elements 5 to 7 of an element 4 are placed between a start element 4A and an end element 4B. The start element 4A and the end element 4B are identical to the element 4. Thus, even if the XML documents are arranged in a row in an order of appearance of the elements, the tree structure of the XML documents can be maintained.

Further, the character-string data that includes the character strings between the tags which are character strings between the start tag and the end tag in each element and the character strings in tags, which are character strings in the start tag and the end tag, is extracted from each element arranged in a row (step S403).

Then, a node-type of each element in the XML documents arranged in a row is identified (step S404) and link data that associates the node-type with the character-string data is generated (step S405).

Figure 6:
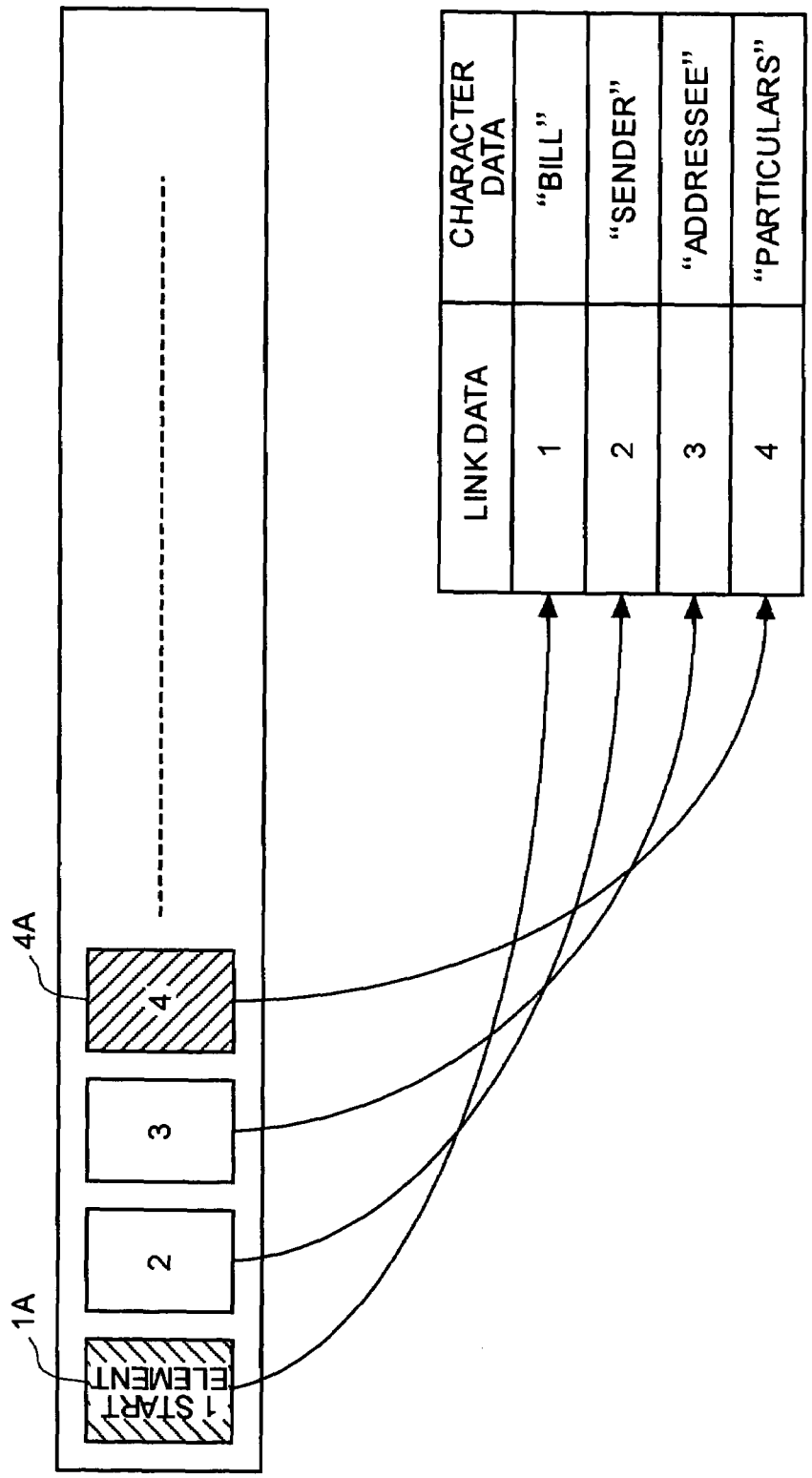
FIG. 6 is a schematic diagram of character-data generation from the XML documents in the procedure for interpretation of the XML documents.

When the character-string data as shown in FIG. 6 is extracted, from the XML documents that are arranged in a row, the XML documents include documents-structure data that includes the node-type and the link data. The documents-structure data and the character-string data are stored in the XML documents storage 208 as interpreted XML documents (step S406).

Examples shown in FIGS. 8 to 12 are examples of storage of interpreted XML documents shown in FIG. 7 that are interpreted and stored. Data shown in FIG. 8 is documents-structure data stored in the XML documents storage 208. A bit length of each documents-structure data shown in FIG. 8 is fixed like 32 bits or 64 bits. When the fixed bit width is 64 bits, 32 bits are occupied by node-type, name space ID, element name ID, and data-type ID. The remaining 32 bits are occupied by element name/attribute data ID. The character-string data stored in the XML documents storage is shown by FIGS. 9 to 12.

Figure 13:
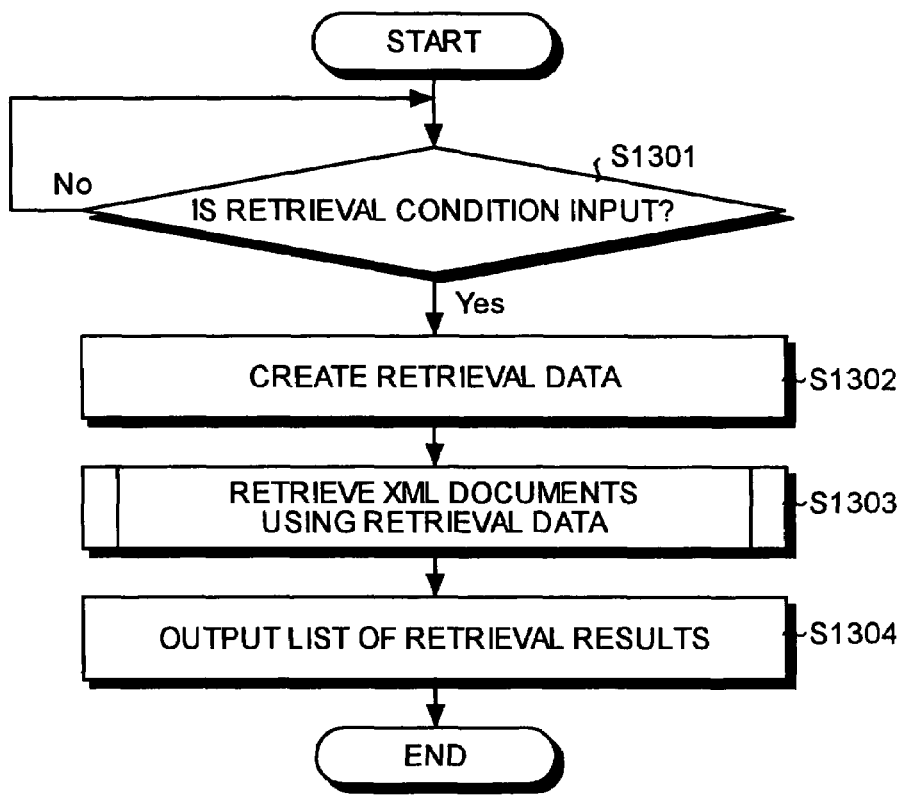
FIG. 13 is a flow chart of a method of retrieving the XML documents according to the embodiment of the present invention.
Figure 14:
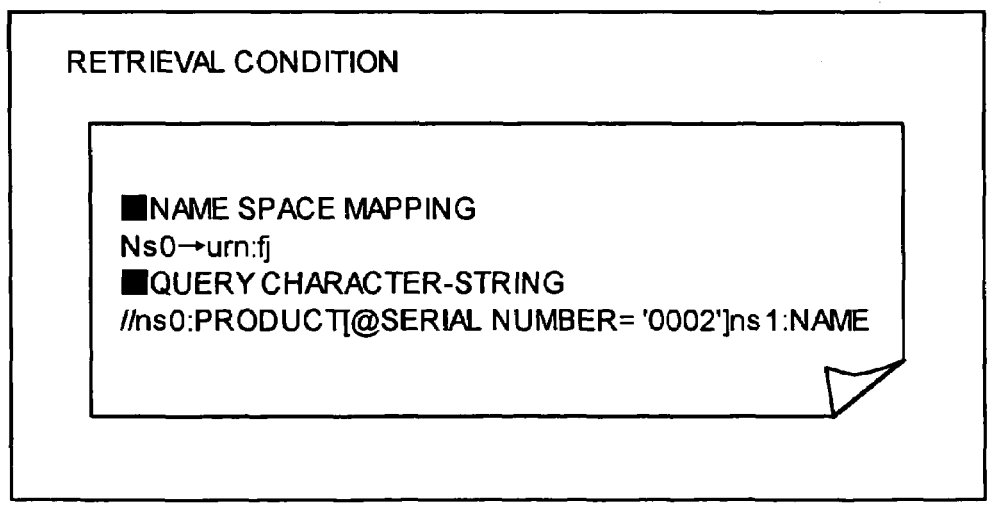
FIG. 14 is an example of retrieval conditions.
Figure 15:
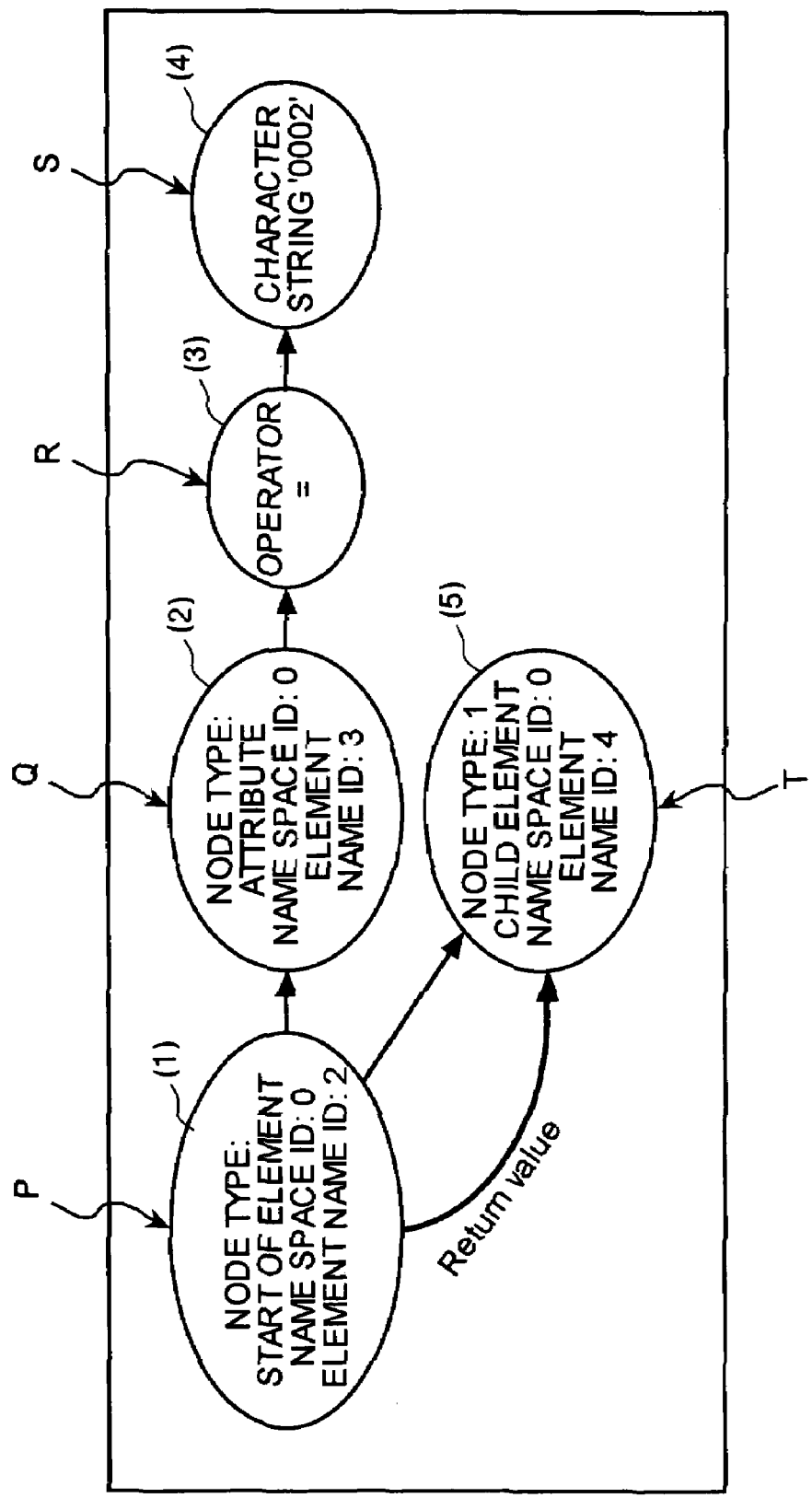
FIG. 15 is an example of retrieval data.

A method of retrieving XML documents that are shown in FIG. 8 to 12 is described below. FIG. 13 is a flow chart of a procedure for a method of retrieving of the XML documents. To start with, when retrieval conditions are input (Yes at step S1301), retrieval data is created (step S1302). An example of retrieval conditions is shown in FIG. 14. The retrieval conditions in FIG. 14 are for retrieving a name (a product name) "0002" which is a serial number of a product that belongs to a name space 0. Retrieval data is created from the retrieval conditions that are input. An example of created data is shown in FIG. 15.

The retrieval data includes first retrieval-data P, second retrieval-data Q, third retrieval data R, fourth retrieval data S, and fifth retrieval data T. The first retrieval data P and the second retrieval data Q are data for node test that retrieves a node-type, a name space ID, and an element ID.

The third retrieval data R indicates operators like "=", "16", "<", ">", "≦", and "≧". The fourth retrieval data S indicates a target to be evaluated. The fifth retrieval data T is data retrieved due to receiving a return value when retrieval is performed by the retrieval data P, Q, R, and S.

According to this retrieval data, if a relation between an evaluated value (character-string data) corresponding to the first retrieval data P and the second retrieval data Q and a target to be evaluated (the evaluated value and the same kind of character-string data) of the fourth retrieval data is established by the operator of the third retrieval data and if the fifth retrieval data matches, the character string subjected to retrieval is there in the XML documents.

Figure 16:
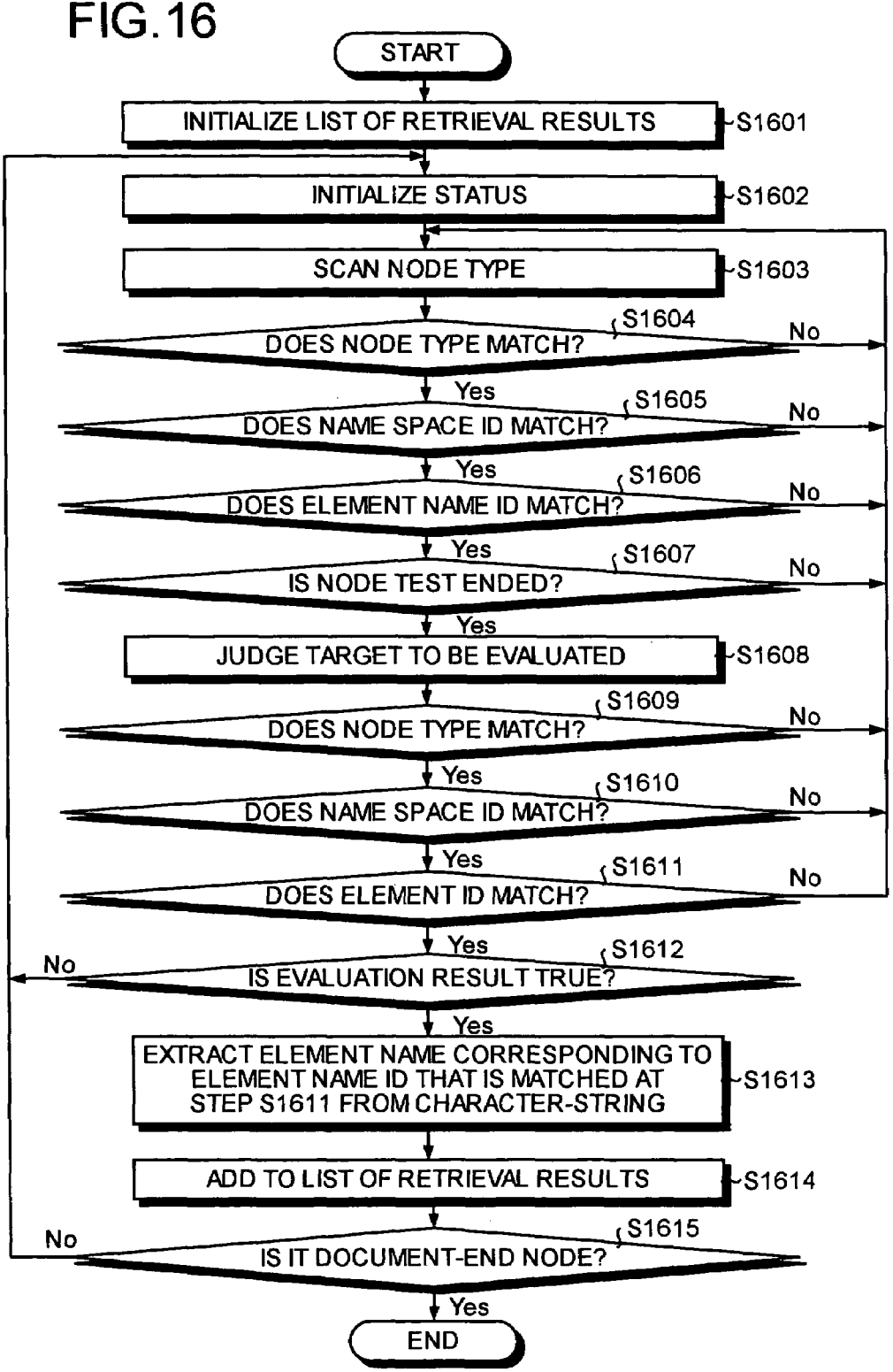
FIG. 16 is a flow chart of a method of retrieval of the XML documents according to the embodiment of the present invention.

Furthermore, XML documents are retrieved using the retrieval data created (step S1303) and a list of retrieval results is output (step S1304). The execution of retrieval process is described below in detail with reference to FIG. 16. To start with, the list of retrieval results is initialized (step S1601) and a retrieval status is initialized (step S1602). Then, node-types are scanned from the top (the beginning) (step S1603).

A node test is performed for nodes that are scanned (step S1604). If the node-type does not match (No at step S1604), the subsequent node-type is scanned (step S1603). If the node type matches (Yes at step S1604), a judgment of whether the name space ID matches is made (step S1605).

If the name space ID does not match (No at step S1605), the subsequent node-type is scanned (step S1603). If the name space Id matches (Yes at step 1605), a judgment of whether the element name ID matches is made (step S1606). If the element name ID does not match (No at step S1606), the subsequent node is scanned (step S1603). If the element name ID matches, (Yes at step S1606), a judgment of whether the node test is ended is made (step S1607).

If the node test is not ended (No at step S1607), the process returns to step S1603. If the node test is ended (Yes at step S1607), a judgment of a target to be evaluated is made (step 1608). Then a judgment of whether a node-type of the return value matches is made (step S1609). If the node-type of the return value does not match (No at step S1609), the subsequent node is scanned (step S1603).

Further, if the node-type of the return value matches (Yes at step S1609), a judgment of whether the name space ID matches is made (step S1610). If the name space ID does not match (No at step S1610), the subsequent node is scanned (step S1603). If the name space ID matches (Yes at step S1610), a judgment of whether the element name ID matches is made (step S1611).

If the element name ID does not match (No at step 1611), the subsequent node is scanned (step S1603). If the element name ID matches (Yes at step S1611) and if the evaluation result is not true (No at step S1612), the retrieval status is initialized (step S1602). If the evaluation result is true (Yes at step 1612), an element name corresponding to the element name ID that has matched at step S1611, is extracted from the character-string data (step S1613).

The element name extracted is added as a retrieval result to the list of retrieval results (step S1614). If the subsequent node is not a document-end node (No at step S1615), the process returns to step S1602. Whereas, if the subsequent node is the document-end node (Yes at step S1615), the retrieval ends.

According to the retrieval process, in steps S1603 to S1607, steps S1609 to S1611, and step S1615, only the documents structure data is retrieved. In steps S1608, 1612, and 1613 only, the character-string data that includes the character-string is retrieved. Therefore, the frequency of referring to the data can be reduced. As a result, the character string to be retrieved can be extracted speedily.

A transition of status when the XML documents shown in FIGS. 8 to 12 were retrieved by the retrieval data in FIG. 15 is described below with reference to FIG. 17. (1) to (5) in FIG. 17 correspond to retrievals (1) to (5) of the retrieval data P, Q, R, S, and T in FIG. 15. To start with, the list of retrieval results and the status are initialized. Further a node test of the first retrieval data is performed for node-types starting from the top (beginning) of the node-types. Since the node-type of the first retrieval data is "start of element", the node-types are scanned till the node-type of the documents-structure data becomes "start of element".

When a node type: "start of element" is scanned (scan A), there is a comparison of link data. Since the element name ID does not match with an element name ID of the first retrieval data, the scanning of the node-type is continued. When a subsequent node-type ID: "start of element" is scanned, there is a comparison of link data. Link data of "start of element" matches with the first retrieval data and the node-test is true.

Since the node test of the first retrieval data is completed, a node test is performed by using the second retrieval data from the subsequent node-type. Since a node-type of the second retrieval data is "attribute", the node-types are scanned till the node type of the documents-structure data becomes "attribute".

Further, when a node type: "attribute" is scanned (scan B), there is a comparison of the link data. Link data of "attribute" matches with the second retrieval data and the node test is true. At this point, the node test is completed and the third retrieval data (operator) and the fourth retrieval data (target to be evaluated) are evaluated In other words, corresponding character-string data is extracted from the character-string data by referring to an element name/attribute data ID and a data-type ID of the node-type: "attribute" that was being scanned when the node test was completed. In this case, since the data-type ID is "text" and "element name/attribute data ID" is "1", character-string data (text data) "0001" is extracted from the character-string data shown in FIG. 12.

Since a relation between the character-string data "0001" extracted and the target to be evaluated "0002" is not established by an operator "=" of the third retrieval data, the evaluation result is false. Since the node test is completed, for the subsequent node-type: "1 child element", a node-test of the return value which is the fifth retrieval data is performed (scan C).

This node test is true and a first retrieval by the retrieval data is completed. The retrieval result is judged. Since the evaluation of the target to be evaluated is false, the retrieval is not succeeded (scan D). The retrieval status is initialized and the subsequent node-type is scanned.

When the node type: "start of element" is scanned (scan E), there is a comparison of link data. Link data of "start of element" matches with the first retrieval data and the node test is true.

Since the node test of the first retrieval data is completed, a node test is performed by using the second retrieval data from the subsequent node type. Since a node-type of the second retrieval data is "attribute", the node-types are scanned till the node type of the documents-structure data becomes "attribute".

When a node type: "attribute" is scanned (scan F), there is a comparison of the link data. Link data of "attribute" matches with second retrieval data and the node test is true. At this point, the node test is completed and the third retrieval data (operator) and the fourth retrieval data (target to be evaluated) are evaluated.

In other words, corresponding character-string data is extracted from the character-string data by referring to the element name/attribute data ID and the data-type ID of the node-type: "attribute" that was being scanned when the node test was completed. In this case, since the data-type ID is "text" and "element name/attribute data ID" is "3", character-string data (text data) "0002" is extracted from the character-string data shown in FIG. 12.

Since a relation between the character string-data "0002" extracted and the target to be evaluated "0002" is established by the operator "=" of the third retrieval data, the evaluation result is true. Since the node test is completed, for the subsequent node-type: "1 child element", a node test of the return value which is the fifth retrieval data, is performed (scan G).

This node test becomes true and a second retrieval by the retrieval data is completed. The retrieval result is judged. Since the evaluation of the target to be evaluated is true and also the node test of the return value is true, the retrieval is succeeded (scan H). Thus, character-string data "LOOX" corresponding to the element name/attribute data ID "0002" and the data-type ID "text" of the node type for which the return value became true is extracted from the character-string data (refer to FIG. 12).

The character-string data "LOOX" extracted is added to the list of retrieval results. The retrieval status is initialized once again and scanning of the node-types is continued. When the node type scanned becomes "document end", the scanning ends.

Thus, the XML documents interpreting and retrieving device 200 according to the present embodiment can interpret the XML documents in advance and store by dividing into the documents-structure data that includes data of fixed length and the character-string data that includes the character-string data. Moreover, the XML documents interpreting and retrieving device 200 according to the present embodiment increases the frequency of referring to fixed-length documents-structure data having a short bit-width and refers to character-string of variable length only when the node-test is completed and when the evaluation is performed. As a result, the frequency of referring to the character-string data of variable length can be reduced. This enables to retrieve information in the XML documents speedily.

The method of interpreting XML documents, the method of retrieving XML documents can be realized by executing computer programs that are prepared in advance in a computer like a personal computer or a work station. The computer programs are recorded in a computer readable recording medium like a hard disc, a flexible disc, a CD-ROM, an MO, a DVD etc. and is executed by the computer by reading from the recording medium. The computer program may be a transmission medium that can be distributed via a network like the Internet etc.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer implemented method of retrieving a target character string from an XML document based on a character-string table and a document-structure table, wherein the character-string table includes a plurality of character strings of variable length extracted from the XML document, and the document-structure table represents a tree structure of the XML document and includes a plurality of entries of fixed length, each of which corresponds to each of a plurality of elements in the XML document and includes a link to any one of the character strings in the character-string table, the method comprising:
  judging whether a first entry in the document-structure table matches with a first condition;
  extracting, from the character-string table, a character string to which the first entry is linked by the link therein when the first entry is judged to match with the first condition;
  judging whether the character string matches with a second condition;
  judging whether a second entry in the document-structure table matches with a third condition when the character string is judged to match with the second condition;
  extracting, from the character-string table, a character string to which the second entry is linked by the link therein as the target character string when the second entry is judged to match with the third condition, and
  outputting the target character string to a list of retrieval results.

2. The method according to claim 1, wherein each of the entries in the document-structure table includes a type of a corresponding element and an identifier of a character string that is extracted from the corresponding element and stored in the character-string table.

3. The method according to claim 2, wherein
  the judging whether the first entry matches with the first condition includes judging whether the type and the identifier in the first entry are identical to a type and an identifier specified in the first condition, respectively, and
  the judging whether the second entry matches with the third condition includes judging whether the type and the identifier in the second entry are identical to a type and an identifier specified in the third condition, respectively.

4. The method according to claim 1, wherein the judging whether the character string matches with the second condition includes judging whether the character string is identical to a character string specified in the second condition.

5. The method according to claim 1, further comprising:
  arranging the elements sequentially in an order of appearance in the XML document;
  extracting a character string described in a tag or between tags from the elements;
  identifying a type of each of the elements; and
  storing the character string and an identifier thereof in the character-string table; and
  storing, in the document-structure table, a plurality of entries each of which includes the type of a corresponding element and an identifier of a character string extracted from the corresponding element, wherein
  the entries are arranged in the document-structure table in an order for which the elements are arranged at the arranging step.

6. The method according to claim 5, wherein the arranging step includes placing a child element of a parent element between a start element and an end element that correspond to the parent element.

7. A computer implemented program for retrieving a target character string from an XML document based on a character-string table and a document-structure table, wherein the character-string table includes a plurality of character strings of variable length extracted from the XML document, and the document-structure table represents a tree structure of the XML document and includes a plurality of entries of fixed length, each of which corresponds to each of a plurality of elements in the XML document and includes a link to any one of the character strings in the character-string table, wherein the computer program causes a computer to execute:
  judging whether a first entry in the document-structure table matches with a first condition;
  extracting, from the character-string table, a character string to which the first entry is linked by the link therein when the first entry is judged to match with the first condition;
  judging whether the character string matches with a second condition;
  judging whether a second entry in the document-structure table matches with a third condition when the character string is judged to match with the second condition;
  extracting, from the character-string table, a character string to which the second entry is linked by the link therein as the target character string when the second entry is judged to match with the third condition, and
  outputting the target character string to a list of retrieval results.

8. The computer program according to claim 7, further causing the computer to execute:
  arranging the elements sequentially in an order of appearance in the XML document;
  extracting a character string described in a tag or between tags from the elements;
  identifying a type of each of the elements; and
  storing the character string and an identifier thereof in the character-string table; and
  storing, in the document-structure table, a plurality of entries each of which includes the type of a corresponding element and an identifier of a character string extracted from the corresponding element, wherein
  the entries are arranged in the document-structure table in an order for which the elements are arranged at the arranging step.

9. A computer implemented apparatus that retrieves a target character string from an XML document based on a character-string table and a document-structure table, wherein the character-string table includes a plurality of character strings of variable length extracted from the XML document, and the document-structure table represents a tree structure of the XML document and includes a plurality of entries of fixed length, each of which corresponds to each of a plurality of elements in the XML document and includes a link to any one of the character strings in the character-string table, the apparatus comprising:
  a first judging unit that judges whether a first entry in the document-structure table matches with a first condition;
  a first extracting unit that extracts, from the character-string table, a character string to which the first entry is linked by the link therein when the first entry is judged to match with the first condition;

a second judging unit that judges whether the character string matches with a second condition;

a third judging unit that judges whether a second entry in the document-structure table matches with a third condition when the character string is judged to match with the second condition;

a second extracting unit that extracts, from the character-string table, a character string to which the second entry is linked by the link therein as the target character string when the second entry is judged to match with the third condition, and wherein the target character string is output to a list of retrieval results.

10. The apparatus according to claim 9, further comprising:

an arranging unit that arranges the elements sequentially in an order of appearance in the XML document;

a third extracting unit that extracts a character string described in a tag or between tags from the elements;

an identifying unit that identifies a type of each of the elements; and a first storing unit that stores the character string and an identifier thereof in the character-string table; and a second storing unit that stores, in the document-structure table, a plurality of entries each of which includes the type of a corresponding element and an identifier of a character string extracted from the corresponding element, wherein the entries are arranged in the document-structure table in an order for which the elements are arranged by the arranging unit.

* * * * *